United States Patent [19]

Dehner, Jr. et al.

[11] Patent Number: 5,373,536
[45] Date of Patent: Dec. 13, 1994

[54] METHOD OF SYNCHRONIZING TO A SIGNAL

[75] Inventors: Leo G. Dehner, Jr., Coconut Creek, Fla.; Kevin M. Laird, Halton, Tex.

[73] Assignee: Motorola, Inc., Schaumburg, Ill.

[21] Appl. No.: 61,756

[22] Filed: May 13, 1993

Related U.S. Application Data

[63] Continuation of Ser. No. 696,415, May 6, 1991, abandoned.

[51] Int. Cl.$^5$ ............................................. H04L 7/00
[52] U.S. Cl. .................................... 375/106; 375/114; 375/116; 327/141
[58] Field of Search ............... 375/114, 115, 116, 118, 375/17, 96, 106; 370/105.4, 105.5; 364/724.1; 328/120

[56] References Cited

U.S. PATENT DOCUMENTS

| | | | |
|---|---|---|---|
| 3,699,261 | 10/1972 | Tomozawa | 375/116 X |
| 3,818,348 | 6/1974 | Puente | 375/116 |
| 4,803,703 | 2/1989 | DeLuca et al. | 375/116 |
| 4,984,249 | 1/1991 | Long et al. | 375/116 |
| 5,016,206 | 5/1991 | Shinonaga | 375/116 |
| 5,123,013 | 6/1992 | Hirayama | 375/116 X |

*Primary Examiner*—Tesfaldet Bocure
*Attorney, Agent, or Firm*—M. Mansour Ghomeshi

[57] ABSTRACT

A method of synchronizing to a signal includes first performing a rough synchronization and then a fine synchronization to a sync word. The fine synchronization includes comparing a stored portion of the sync word to a received portion. By adjusting the timing and then performing additional correlations, the timing for the best correlation can be obtained. The bit clock is then adjusted so that subsequent data samples can be taken as close to bit center as possible.

9 Claims, 5 Drawing Sheets

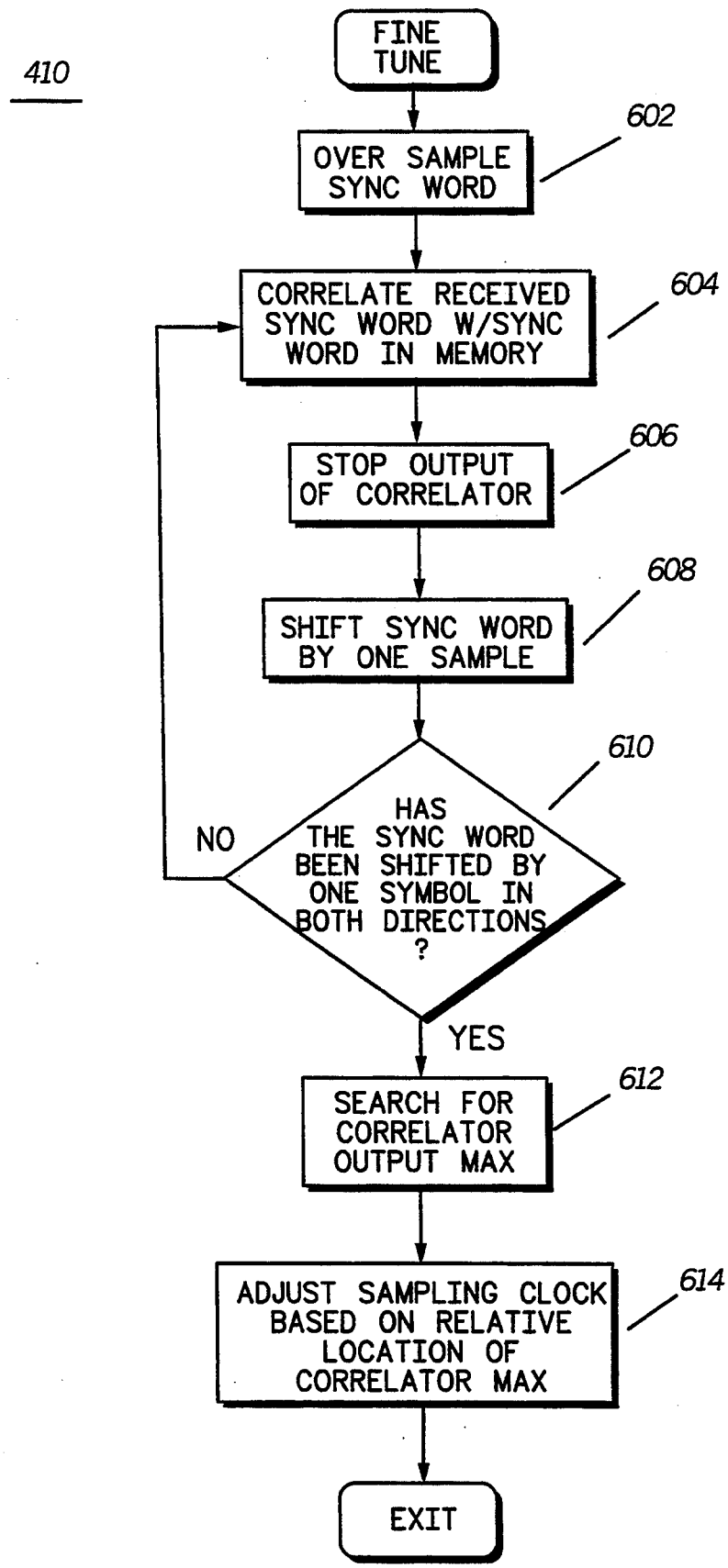

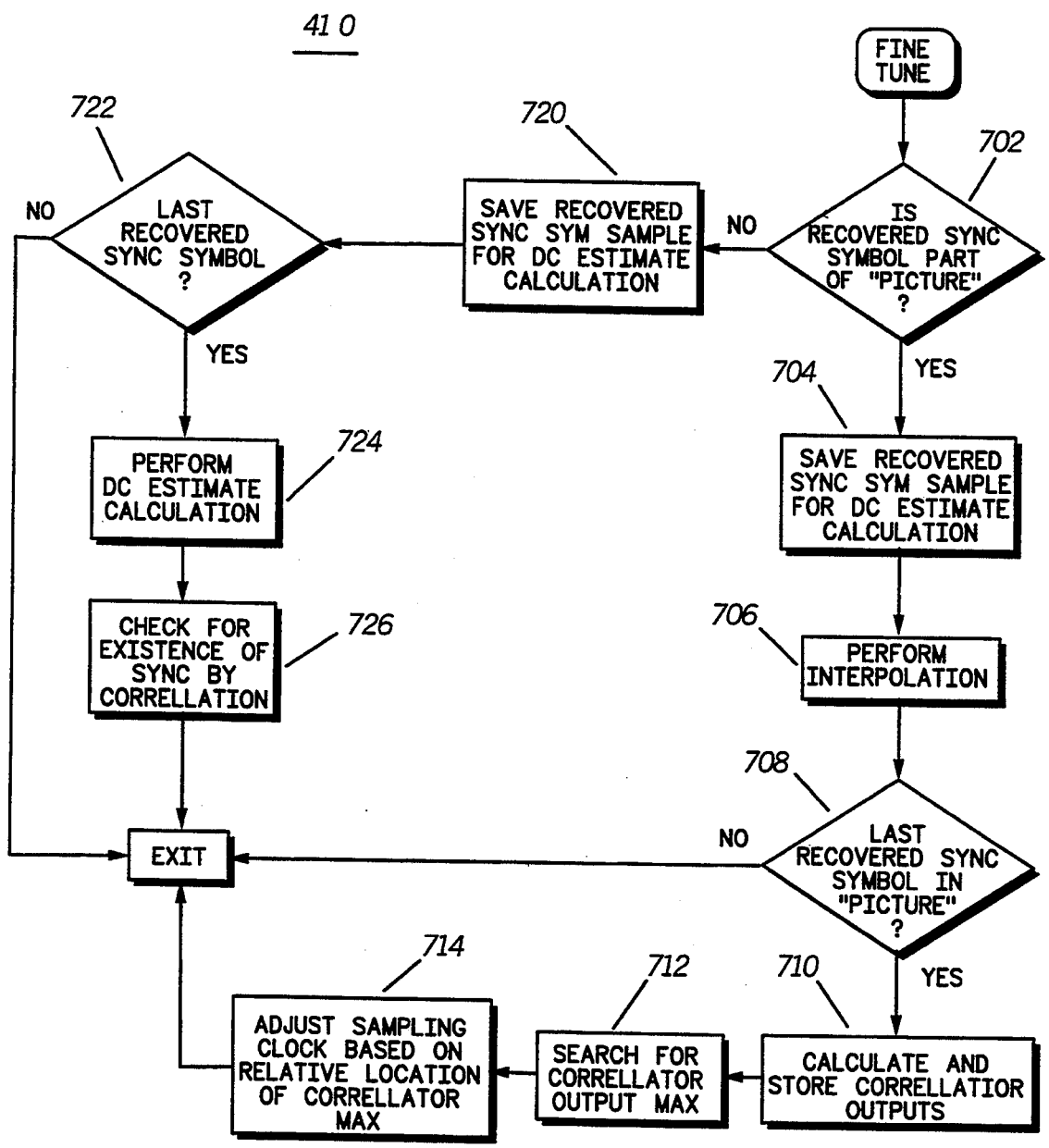

5,373,536

METHOD OF SYNCHRONIZING TO A SIGNAL

This application is a continuation of application Ser. No. 07/696,415, filed on May 6, 1991, now abandoned.

TECHNICAL FIELD

This invention relates to a method of synchronizing to a signal in general and particularly to a method of synchronizing to a signal using multi-step tuning.

BACKGROUND OF THE INVENTION

There are many approaches for recovering information from a data signal. For binary or two level signals it is possible to continuously correct the synchronization for the received data. This is traditionally accomplished by sampling at a rate that is higher than the data rate. The multiple samples per bit of information can be processed and the bits defined. Such approach requires both multiple samples for each bit of information and substantial computational power which can be a disadvantage when used in an application such as portable or mobile radios. Such devices may have limited computational power available, as well as limited battery life for portable devices. Additionally, such approaches are not well suited where the information signal can include a high number of possible levels. For instance, a signal that could include data as binary data and analog or multiple level data such as 256 level encoded compressed voice information, presents difficulties in utilizing the traditional approach. It is therefore desirable to have a synchronization and decoding method that can precisely lock to a symbol so that a sample can be obtained at the center of each information symbol without sacrificing efficiency. By sampling at the symbol center, a single sample per symbol can be utilized for decoding.

SUMMARY OF THE INVENTION

This method of synchronizing to a signal for information recovery can precisely lock an apparatus to an information signal having a sync word in order to permit sampling at the center of each symbol or bit. Synchronization is obtained by performing a first synchronization routine to synchronize to a sync word. A further synchronization routine is then performed to more precisely synchronize to the sync word. The received signal is then sampled to recover transmitted information.

BRIEF DESCRIPTION OF THE DRAWINGS

FIG. 6 is flow chart of the fine tune routine of FIG. 4.

FIG. 7 is a more detailed flow chart of the fine tune routine of FIG. 4.

DESCRIPTION OF THE PREFERRED EMBODIMENT

Figure 1:
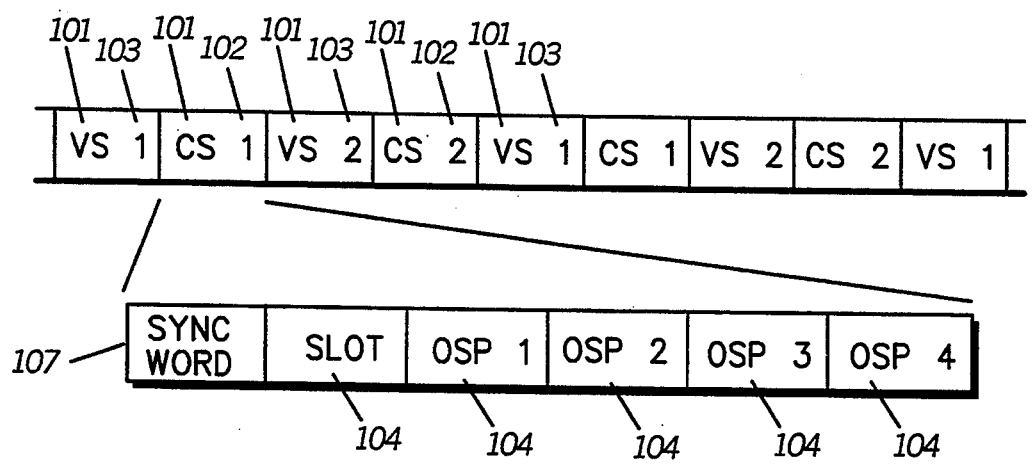
FIG. 1 is a timing diagram of a communication resource format implemented in accordance with the present invention.

For purposes of this description, an embodiment of the invention will be described in conjunction with a time division multiplexed TDM communication resource. In this particular example, the frequency is subdivided into time frames, wherein each time frame is further subdivided into four time slots 101 as shown in FIG. 1. In a given time frame, two of the time slots 102 are used for the transmission of binary signalling information relevant to the allocation of voice time slots 103 and other system control information.

Figure 2:
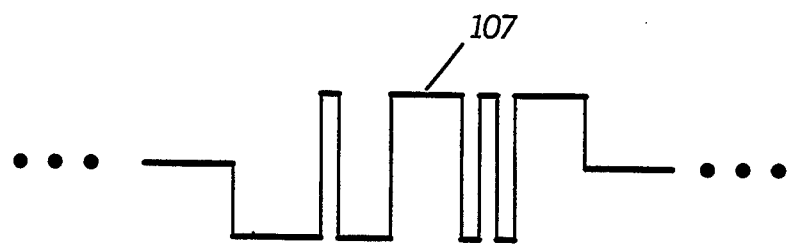
FIG. 2 is a depiction of a sync word waveform in accordance with the invention.

Each control slot 102 in turn includes space for four commands 104, a slot designation 106, and a sync word 107. In this embodiment, the sync word 107 is comprised of the hex word zero nine D seven 09D7 see FIG. 2. In binary form, as represented in FIG. 2, this equates with the sequential transmission of: 0000100111010111.

In this embodiment, it will be presumed that the constituent elements of the sync word will be transmitted in a pre-determined order, as set forth above, with each broadcast. In a particular application, however, such a requirement may not be necessary. Indeed, the sync word may be a segment of the received data having a high enough recurring rate. Also, in this particular embodiment, the average value of the sync word elements equals zero.

Figure 3:
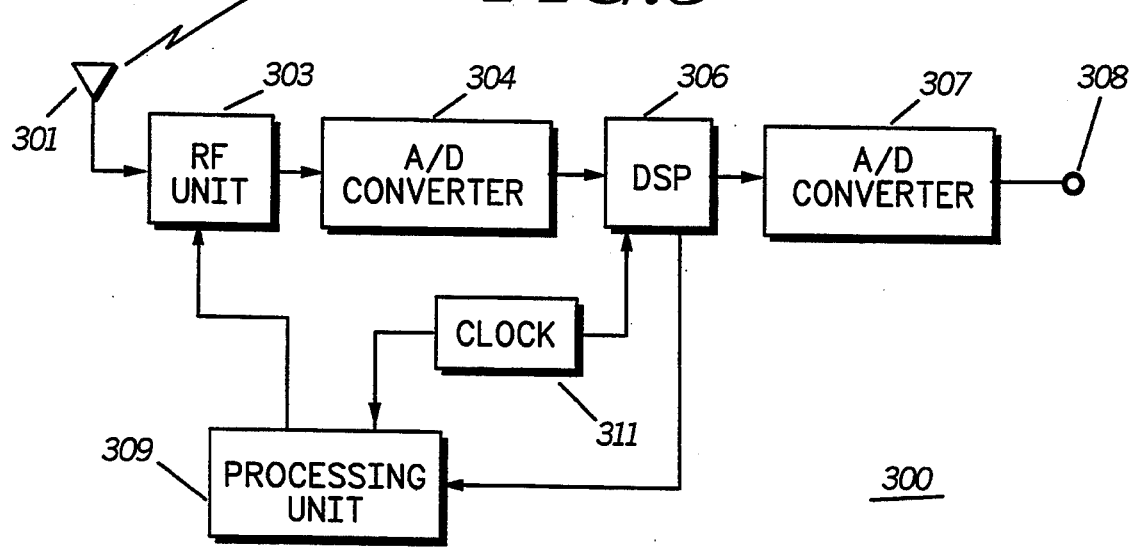
FIG. 3 is a block diagram of a radio receiver having synchronization in accordance with the present invention.

Referring to FIG. 3 a receiver 300 is shown in accordance with the principles of the present invention. The receiver 300 is suitable for practicing the method of the present invention. This receiver 300 includes an antenna 301 for receiving the signalling information 302 transmitted to it, including the data sync words 107. These signals 302 are processed in an appropriate RF unit 303. The RF unit 303 includes filters, power supplies, and IF circuits. In the preferred embodiment, the baseband IF signal is supplied from the RF unit 303 to an analog to digital converter 304 for application to a digital signal processor DSP 306, (such as a 56000 family device as manufactured and sold by Motorola, Inc.) where the signal can be demodulated and processed as desired. Voice transmissions received and processed in this way can be reconverted to analog form by a digital to analog convertor 307, and the resulting audio signal 308 can be further processed and amplified as appropriate to the particular application. In the preferred embodiment, the DSP 306 provides a function of IF filtering as well as acting as an FM discriminator. However, if desired, those functions could be provided at the RF unit 303 and the A-D converter 304 could be used to digitize the discriminator output for further processing by the DSP 306. Preferably, the A-D converter 304 is a bandpass sigma/delta analog to digital converter.

The receiver 300 further includes a processing unit 309 to control the operation of the RF UNIT 303 and the DSP 306 In addition, the processing unit 309 can receive and process recovered signalling information from the DSP 306. Also, an appropriate clock 311 provides necessary clock signals to the DSP 306 and processing unit 309, as may be appropriate to the particular application. The clock 311 provides the sampling rate for the DSP 306 and a clock reference for the processing unit 309. A memory block is included in the DSP 306. The sync word is stored in this memory block and is commonly referred to as picture sync.

So configured, signals 302 received by the receiver can be processed in various programmable ways in the DSP 306. Some such configurations, of course, are known in the art. In the preferred embodiment, information signals include periodic sync information such as an 8 or 16 bit symbols followed by data symbols which can either be binary, multi-level, or analog type signals. In operation, the DSP 306 utilizes the sync word to precisely lock to the receive signals so that the subsequent data information can be sampled at the center of each symbol thereby allowing a single sample for each symbol or bit. This synchronization is accomplished by first performing a rough or coarse synchronization to the sync word and then performing a fine precise synchronization based upon at least a portion of the sync word.

Figure 4:
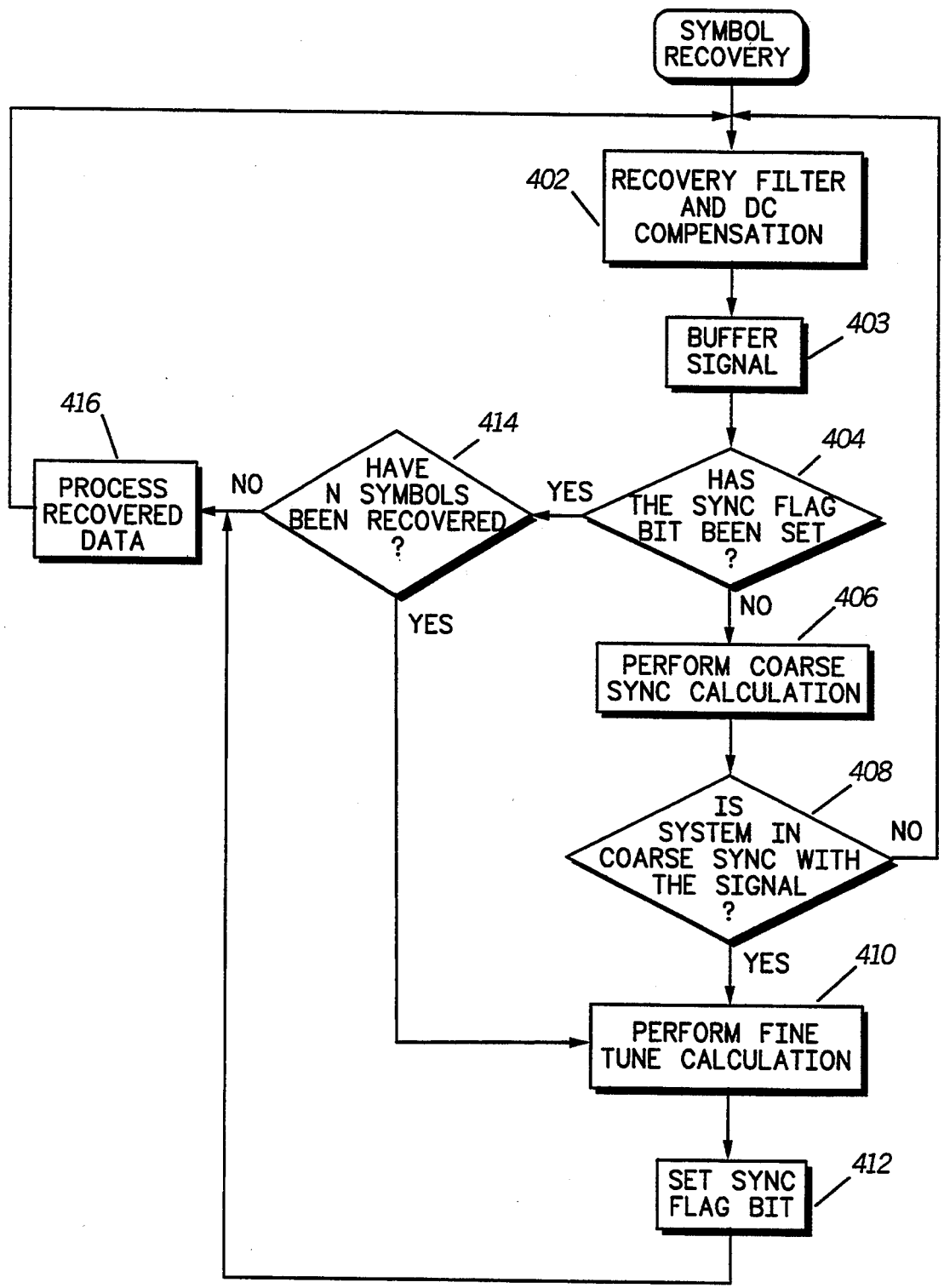
FIG. 4 is a flow chart of the synchronization utilized in conjunction with the radio of FIG. 3.

The operation of the receiver 300 can be best understood by reference to the accompanying flow charts. Referring first to FIG. 4, symbol recovery begins at block 400. The digital representations of the discriminator output and any necessary offset DC compensation is provided by the DSP 306 at block 402. The response from block 402 is stored in a buffer, block 403. Next, a determination is made as to whether or not the sync flag bit has been set, block 404. The sync flag bit is a parameter maintained by the DSP 306 to indicate whether sync has been previously acquired. At this block 404, the system determines the reception of a new signal. With a new received signal, the, receiver 300 must perform two sets of tuning; a coarse tune and a fine tune. In other words the condition block 404 determines whether the signal being received is a new signal or is merely the continuation of a signal in progress. If the sync flag bit has not been set, a coarse sync calculation is performed, block 406, which is illustrated in further detail in FIG. 5. The output of block 406 is coupled to a condition block 408 where a decision is made as to whether the system is in coarse sync with the incoming signal. The loop is returned to block 402 if no coarse sync has been achieved. With the system in coarse sync with the incoming signal, the operation performs a fine tune calculation, block 410. The output of block 410 sets the sync flag bit via block 412.

The YES output of block 404 is coupled to a condition block 414 where the recovery of N symbols is questioned. The YES output of this condition block 414 is coupled to block 410 where a fine tune calculation along with any necessary estimates of DC offset and sync check is performed. The operation of block 410 is illustrated in further detail in FIG. 6. The loop formed by blocks 404, 414, and 410 continues until N symbols have been recovered. N is an integer equal to the number of symbols per sync frame. A sync frame is the collection of symbols from the start of one sync word to the start of the next. In the preferred embodiment, N is equal to the number of symbols between sync words. Note that in applications where the sync word is the combination of a number of symbols randomly located in a received signal, the integer N may take a different value at each instant of time, The NO output of block 414 is routed to a process recovered data block 416 where the data is decoded. The output of block 412 is also coupled to the input of block 416. The operation returns to block 402 upon recovering data via block 416.

To summarize, a flow chart of the operation of the receiver 300 is described. Upon signal recovery, a coarse sync calculation is performed after it has been determined that the sync flag bit has not been set. This coarse tune is followed by a fine tune procedure which includes setting of the sync flag bit upon completion. Once the sync flag bit has been set, the operation recovers N symbols before performing another fine tune calculation.

Figure 5:
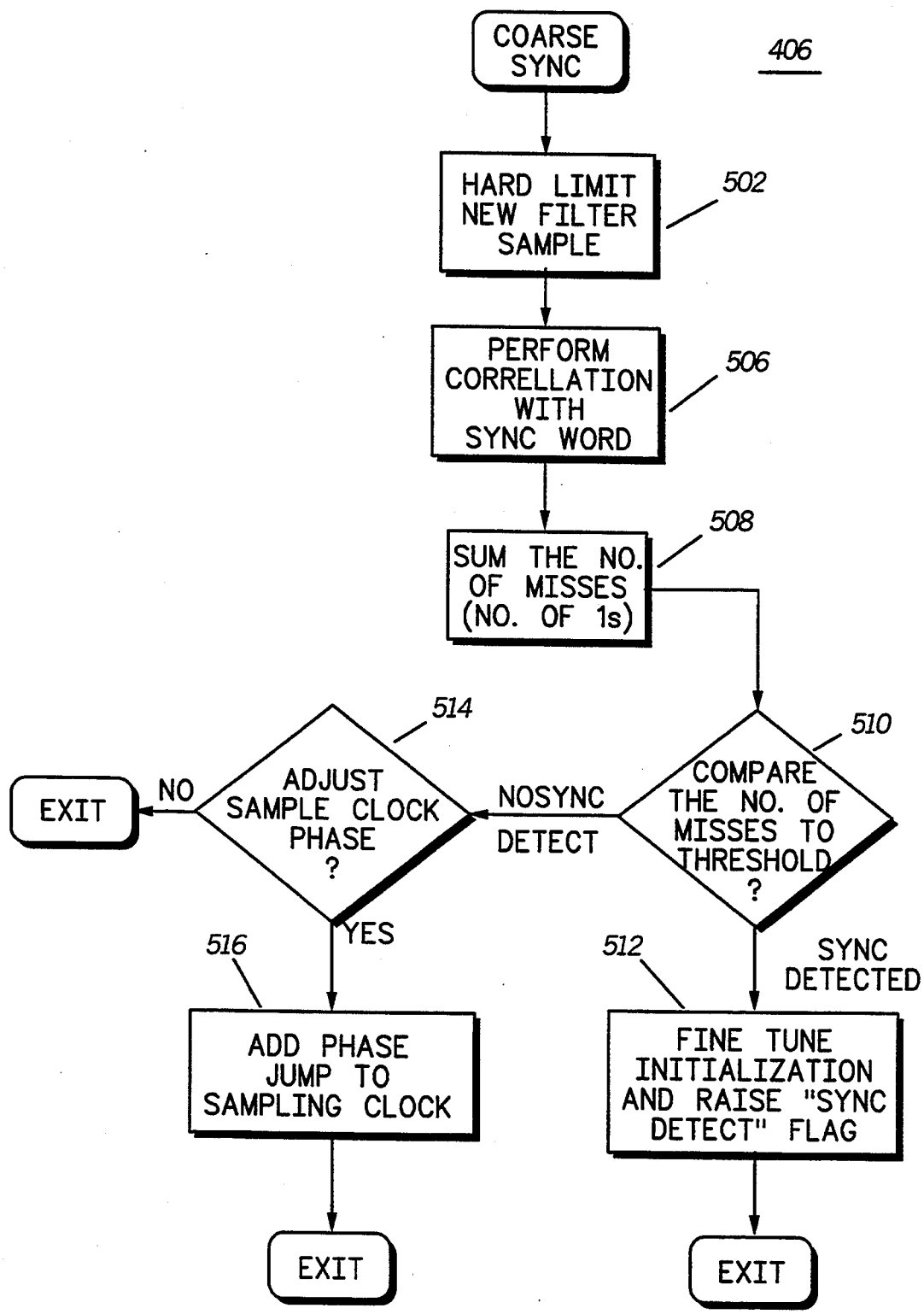
FIG. 5 is a flow chart of the rough sync routine of FIG. 4.

The coarse sync procedure of FIG. 5, is used to obtain an approximate synchronization when the received signal is not in sync. Once coarse sync has been established, the fine tune procedure is utilized to enable precise sampling of the incoming data string. The coarse sync procedure includes first hard limiting the new filter sample, block 502. At this block 502, a threshold comparator is used to decode the received signal and distinguish between 1s or 0s. The received sync word is then correlated with the known sync word, block 506. This correlation is a simple EX-ORing of the received signal and the stored sync word. With the two signals correlated, the number of misses are summed, block 508. With EX-OR function, the number of misses is equal to the number of 1s. The results are compared to see if they match the known sync word within a predetermined threshold, block 510. This is accomplished by comparing the number of misses to a pre-determined figure. If sync is detected, the sync detect flag is raised, block 512 and the procedure can either go immediately to the fine tune process, block 412 or return to block 402. If the sync is not detected at decision block 510, a determination is made as to whether it is necessary to adjust the sampling clock phase, block 514. If adjustment is necessary, a phase jump is added to the sampling clock, block 516, and the routine returns to block 402. If, however, the adjustment of the sampling clock phase is not necessary the routine branches directly to block 402. The adjustment of the sampling clock phase is necessary when the sampling is being conducted too close to the symbol edges. When this is the case, a proper sampling may never be achieved. By adjusting the phase of the sampling clock, the sampling will be conducted away from the symbol edges which results in achieving proper coarse sync.

Once coarse sync has been obtained, the fine sync procedure is used for very precise synchronization for symbol sampling. The fine sync can be used at every subsequent occurrence of the sync word if desired. Referring to FIG. 6, the fine sync tune procedure starts by first over-sampling (multiple samples per symbols) the received sync word, block 602. The over-sampled sync word is then correlated with the sync word in the memory, block 604. The output of the correlator is then stored, block 606. Next, the sync word is shifted by one sample via blocks 608. With the sync word shifted a determination is made as to whether the sync word has been shifted by one symbol in both directions, block 610. If so, a search is performed on the stored correlator outputs to determine which is maximum, block 612. This may be done using comparators and comparing a number of stored correlator outputs. The output of block 612 is coupled to block 614 where the symbol sampling clock is adjusted based on the relative location of the highest correlation output for the various samples, block 614. This is accomplished by finding the amount of time between peak and center of the stored correlation outputs. The output of block 614 exits the fine tune routine 412 and returns to block 402.

A more specific case of the fine tune procedure 412 is demonstrated via the flow chart of FIG. 7. The operation first determines if the recovered sync symbol is part of a stored sync word picture. This is done by doing a precise comparison of the recovered symbol, which is typically a part of the sync word, with a stored image of a sync word portion, block 702. If it is part of the picture, the recovered sync symbol sample is saved for DC offset estimate calculation at block 704. An interpolation (over-sampling) of the received signal is performed, block 706. A determination is then made as to whether the last recovered sync symbol on the picture has been examined, decision block 708. If so, a correlator output is calculated and stored, block 710 and a search is performed of the stored correlator outputs to determine which is maximum, block 712 and the sampling clock is adjusted based on the relative location of the highest correlation output for the various samples, block 714. The routine will then return to block 402. If decision block 702 is NO, the recovered sync symbol is determined not to be part of the picture, the sample is saved for DC offset calculation purposes, block 720. A determination is then made as to whether the last recovered sync symbol has been reached, block 722. If no, the fine tune subroutine returns to block 402. However, if it is reached, a DC offset estimate is calculated, block 724, and a check is then made for the existence of sync using a correlation technique at block 726. In the event that the sync has been lost, the algorithm checks the existence of the sync a few more times (namely three times). If sync was not detected, the sync flag bit will be cleared. The routine then returns to block 402.

The sync word mentioned in the above described flow charts is assumed to be a pre-determined combination of symbols used solely by the system to allow the receiver 300 to synchronize to an incoming signal. These sync words serve only to sync the receiver 300 with an incoming signal. Specifically, the sync word serves to locate the first symbol of data and locate its center for proper recovery. As can be appreciated, the throughput of the system suffers with these sync words which carry no data other than synchronization. To eliminate this problem, a system may use a portion of the transmitted data as the sync word. A combination of recurring symbols i.e. 101, can be used as the sync word. The receiver 300 monitors the incoming information signal and searches for this highly recurring combination of data. With this feature, no sacrifice of channel efficiency is necessary to achieve fast and reliable synchronization.

While it is thought that the operational features and functional advantages of this synchronization method have become fully apparent from the foregoing description, but for completion of the disclosure, a brief description of the operation and synchronization process will be given. In order to obtain synchronization, the receiver 300 utilizes the sync words of the incoming signal. The DSP first identifies and locates a sync word by performing a rough sync operation which utilizes the incoming data stream and performs a rough correlation to the sync word until the sync word has been detected. At that point, a fine tune procedure is utilized to precisely synchronize to the incoming symbol string thereby allowing a single sample per bit or center slicing of subsequent data. The fine tune procedure stores an digitized image of a least a portion of the sync word. The incoming sync word portion is also digitized and compared with the stored image. By making time adjustments between the received and stored signals, the best match between the two can be located thereby defining any necessary timing changes for decoding subsequent data information. This newly established timing is utilized for the data and no ongoing correction is done while the data is being recovered until a subsequent sync word is received. At that time, the fine tuning procedure is again performed to assure that the sampling clock is precisely aligned with the incoming data string for further decoding of the next portion of data.

In summary, a synchronization and decoding method has been described that can precisely lock to a symbol so that a sample can be obtained at the center of each information symbol without sacrificing efficiency. By sampling at the symbol center, a single sample per symbol can be utilized for decoding. By periodically sampling at symbol centers, computational power requirements are brought down making it possible for portable and mobile products which have limited computational power to take advantage of this method.

What is claimed is:

1. In an apparatus, a method of synchronizing to a signal having a sync word for information recovery, comprising the steps of:
    performing a first synchronization routine to roughly synchronize the apparatus to the sync word, comprising:
        correlating the signal to a known sync word;
        detecting misses between the signal and the known sync word in response to the step of correlating;
        summing the number of misses;
    indicating the detection of the sync word in response to the number of misses;
    then performing a bit synchronization routine in response to the step of indicating so as to more precisely synchronize the apparatus to the sync word, and
    then sampling the signal in response to the apparatus being synchronized to the sync word in order to recover the information.

2. The method of claim 1, wherein the sync word includes a combination of symbols randomly occurring in the information signal.

3. The method of claim 1, wherein the sync word includes a sync word having a pre-determined format.

4. The method of claim 1, wherein the step of performing a bit synchronization routine includes:
    correlating the sync word with a picture sync in response to the step of indicating the detection of the sync word; and
    comparing the correlation output to a threshold value.

5. In a receiver having a sampling clock and a picture sync, a method of synchronizing to a received signal for information recovery comprising the steps of:
    performing a first synchronization routine including:
        sampling the received signal at the rate of the sampling clock;
        correlating the sampled signal to a known sync word;
        detecting misses between the sampled signal and the known sync word in response to the step of correlating;
        summing the number of misses;
    detecting the presence of a received sync word in the received signal by comparing the number of misses with a threshold;
    performing a further synchronization routine in response to the step of detecting, including:

correlating the received sync word with the picture sync; comparing the correlation output to a threshold value; and aligning the sampling clock.

6. The method of claim 5, wherein the sync word comprises a combination of symbols having a pre-determined format.

7. The method of claim 5, wherein the sync word includes a combination of multi-level symbols having a pre-determined format.

8. The method of claim 5, wherein the step of detecting includes the step of interpolating the samples of the received signal.

9. The method of claim 5, wherein the sync word is a recurring segment of the received signal.

* * * * *